Figure 1:
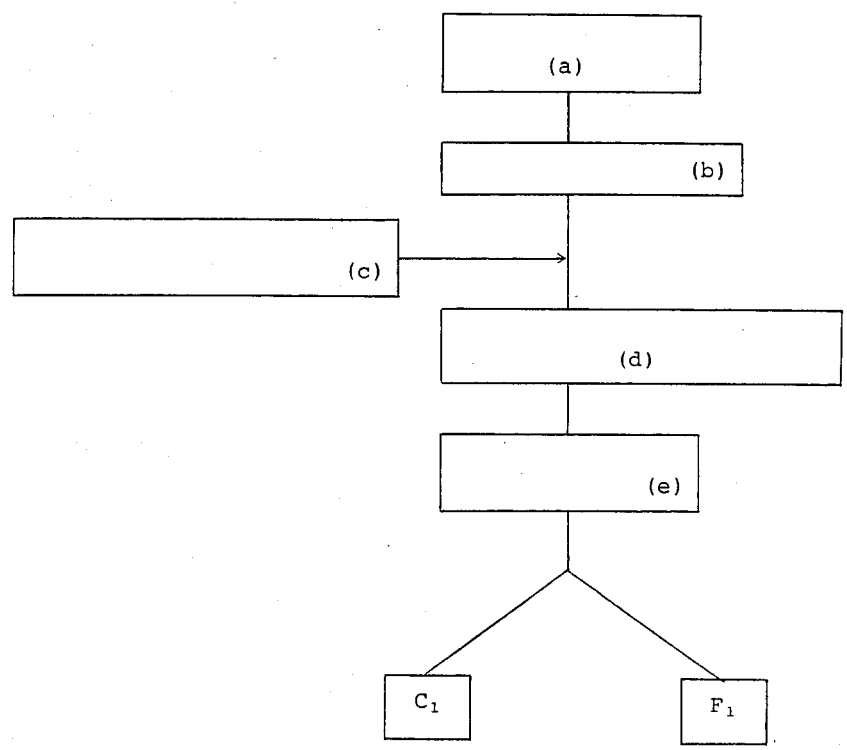

United States Patent [19]

Dieffenbacher

[11] Patent Number: 4,594,194
[45] Date of Patent: Jun. 10, 1986

[54] FAT FRACTIONATION

[75] Inventor: Albrecht Dieffenbacher, Saint-Légier, Switzerland

[73] Assignee: Nestec S.A., Vevey, Switzerland

[21] Appl. No.: 648,180

[22] Filed: Sep. 7, 1984

[30] Foreign Application Priority Data

Oct. 7, 1983 [CH] Switzerland ............ 5467/83

[51] Int. Cl.$^4$ ............................................. C09F 5/10
[52] U.S. Cl. ................................. 260/428; 260/420
[58] Field of Search ........................... 260/420, 428

[56] References Cited

U.S. PATENT DOCUMENTS

| | | | |
|---|---|---|---|
| 4,161,484 | 7/1979 | ven den Berg | 260/428 |
| 4,284,580 | 8/1981 | Logan et al. | 260/428 |
| 4,360,536 | 11/1982 | Keuning et al. | 260/428 |
| 4,447,462 | 5/1984 | Tafuri et al. | 260/428 |

FOREIGN PATENT DOCUMENTS

| | | | |
|---|---|---|---|
| 2916604 | 12/1980 | Fed. Rep. of Germany . | |
| 2427386 | 12/1979 | France | 260/428 |
| 2048928 | 4/1980 | United Kingdom | 260/428 |

Primary Examiner—Werren B. Lone
Attorney, Agent, or Firm—Vogt and O'Donnell

[57] ABSTRACT

A vegetable fat is subjected to dry fractionation, i.e. without the use of solvents or detergents, with a view to obtaining a concrete fraction compatible with cocoa butter in one or two fractionation cycles.

In each of these cycles, the fat melted beforehand is seeded with stabilized $\beta$ or $\beta'$ crystals thereof, the liquid is progressively cooled and the suspension obtained is pressed by the application of a progressively increasing pressure.

The concrete fractions obtained may be used instead of cocoa butter as confectionery fats.

14 Claims, 2 Drawing Figures

FAT FRACTIONATION

This invention relates to a process for the dry fractionation of a vegetable fat capable of crystallizing in several forms at temperatures around ambient temperature, to the fractions obtained and to their use.

Natural fats are complex mixtures of triglycerides of which the composition includes solid saturated fatty acids and liquid unsaturated fatty acids having different chain lengths. The composition of the fatty acids and their distribution within the triglyceride molecules are particular to each fat and determine its properties and, in particular, its melting behavior. Since natural fats are mixtures, (eutectic) interaction phenomena occur within a certain temperature range, modifying the physical state of the constituents, the triglycerides being capable in addition of crystallizing in several forms.

Vegetable fats, for example cocoa butter, generally show these crystalline polymorphism phenomena around ambient temperature is cases where the disaturated-monounsaturated and monosaturated-diunsaturated triglycerides are preponderant. Apart from cocoa butter, these fats are not directly used in foods because of their plastic character and it has been proposed to fractionate them to enable them to be used either as table oil or as confectionery fat, for example as a substitute for cocoa butter.

The confectionery/chocolate industry uses large quantities of cocoa butter because of its unique physical properties which are highly valued in that industry: it is solid up to 25° C., melts rapidly in a narrow temperature range between 35° and 37° C. (particularly in the mouth, which produces sensations of melting and taste) and hardens rapidly with controllable shrinkage on cooling (which enables it to be removed from moulds). Accordingly, consideration has been given to the use of other vegetable fats available in greater abundance as a substitute fat because the climatic zones in which cocoa can be grown are restricted and the supply of cocoa butter is limited. Fats of the type in question have to show physical behavior very similar to that of cocoa butter to be compatible therewith. With the object of producing such substitutes, vegetable fats, particularly palm oil, are industrially fractionated by various methods:

A first method using solvents comprises cooling a solution of the fat in an organic solvent, for example acetone, hexane, isopropanol, 2-nitropropane, dichlorodifluoromethane, trichlorotrifluoroethane, separating the stable $\beta$ and $\beta$ crystalline forms required by filtration and eliminating the solvent by evaporation. This method may be applied to natural oil, for example as described in GB-PS No. 827 172, or to a concrete fraction obtained after a first dry fractionation step. To increase the yield of table oil whilst at the same time producing a fraction suitable for use in confectionery, this method has been applied to an oil that has undergone catalytic interesterification (or transesterification), i.e. an internal rearrangement of the fatty acids in the triglyceride molecule, for example as described in French Patent Application No. 2 427 386. Another process described, for example, in U.S. Pat. No. 3 431 116 comprises selectively hydrogenating a stearin obtained as by-product in the manufacture of table oils from cotton seeds to convert the linoleic acid into oleic acid before the fractionation treatment with solvents. Although all these known processes enable fractions suitable for use in confectionery to be obtained, they have the disadvantage of using chemical agents and/or solvents which have to be treated and recycled and also eliminated from the fats. This requires heavy installations which are not always available in the regions where the starting material is gathered and involves considerable energy consumption.

A second method carried out in aqueous medium is based on the wettability of the crystals in the presence of a surfactant which enables an aqueous suspension of crystals to be separated from the liquid oil, the crystals being subsequently collected by centrifuging. This method has the disadvantage of producing a large volume of waste waters.

A third method comprises dry fractionation. In this method, which is described for example in German Patent Application No. 29 16 604, the entirely liquid fat is treated in a controlled manner and, after the molten mass has been seeded with $\beta$ crystals of the fat at 45° C., the melt is cooled and the crystals formed are filtered. The operation is carried out a second time at a lower temperature. This method does not prevent the occlusion of part of the liquid fraction in the crystal aggregates, which leads either to a fraction that does not have the required characteristics or to a low yield at the separation stage. This confirms the opinion generally held among experts that it has not hitherto been possible to obtain a concrete fraction compatible with cocoa butter by dry separation from palm oil in a yield comparable with that obtained where solvents are used.

The present invention seeks to provide a process for the dry fractionation of vegetable fats capable of crystallizing in several forms at temperatures around ambient temperature which gives concrete fractions compatible with cocoa butter in a yield comparable with that obtained by fractionation with solvents without having any of the disadvantages attending the known processes of aqueous or solvent fractionation.

The process according to the invention comprises the following steps:

(a) the pre-refined fat is heated to convert it entirely into liquid form, (b) the liquid of step (a) is cooled to a temperature 3° to 10° C. above its solidification temperature, (c) it is then seeded with $\beta$ or $\beta'$ crystals obtained from said fat or from cocoa butter and stabilized in the required form by storage, (d) the suspension of step (c) is progressively cooled at a rate of 0.5° to 1.5° C. per hour to a fractionation temperature in the range from 15° to 35° C. and (e) the suspension of step (d) is filtered under a pressure of at least 20 kg/cm$^2$ at the fractionation temperature and a concrete fraction ($C_1$) having an iodine value of at most 50 and a fluid fraction ($F_1$) having a higher iodine value than the concrete fraction ($C_1$) are collected, the difference between the iodine value of the fraction ($C_1$) and that of the fraction ($F_1$) being at least 10, and if necessary the sequence of operations from the fluid fraction ($F_1$) is repeated until the desired concrete fraction is obtained.

The vegetable fats capable of being fractionated in accordance with the invention are those which show a crystalline polymorphism around ambient temperature, i.e. between 20° and 35° C. Vegetable fats such as these, which are known generically as vegetable tallows, include shea butter (karite, Butyrospermum parkii or Bassia parkii), sal butter (*Shorea robusta*), Borneo tallow (*Shorea stenoptera*), kokum butter (*Garcinia indica*), mango kernel butter (*Mangifera indica*), mowrah fat (*Madhuca latifolia* and *Madhuca longifolia*), palm oil (*Elaeis guineensis*), etc.

The expression "pre-refined fat" means that the fat has been subjected to the removal of mucilages to insolubilize the phospholipids, the polysaccharides, the gums, the resins, etc. . . . which are separated by centrifuging, neutralization to eliminate most of the free fatty acids in the form of soaps to a free fatty acid content of less than 0.2% and preferably less than 0.1% by weight. The fractionated fat is preferably refined in known manner by the following successive additional operations:

decoloration by passage in molten form over active carbon or other adsorbents, for example bleaching earths based on activated aluminium silicate, such as montmorillonite or bentonite, and filtration to remove the chlorophyll and the carotenoid pigments and deodorization by stripping with steam in vacuo at a temperature below 260° C. and preferably at a temperature below 200° C.

All the pre-refining and refining steps have to be carried out in such a way as to avoid isomerization of the triglycerides.

Figure 2:
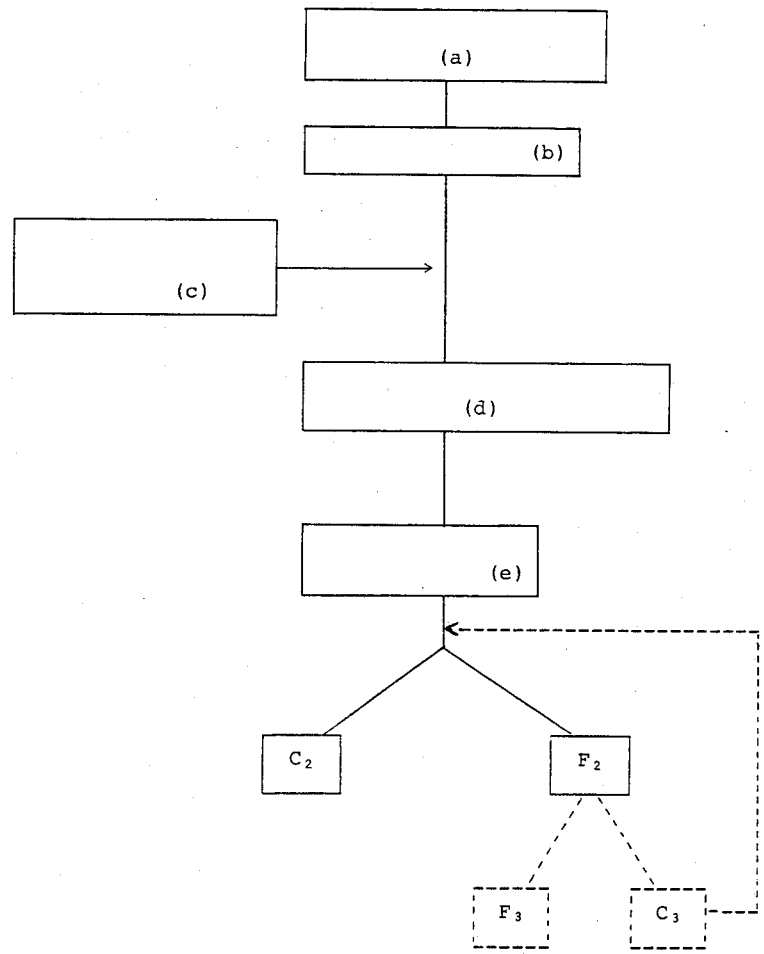

The process according to the invention may be carried out in accordance with schemes 1 and 2 of the accompanying drawing (FIGS. 1 and 2) which represent two embodiments of the invention respectively comprising one or two fractionation cycles.

SCHEME 1

This embodiment comprises a single fractionation cycle and is particularly suited to vegetable tallows, such an mango butter, sal butter, mowrah fat or kokum butter, which are rich in saturated and monounsaturated acids and which have a particular configuration of the triglycerides characterized by a high percentage of 2-monounsaturates and a low percentage of trisaturates. This composition makes them fairly similar to cocoa butter from the chemical and physico-chemical viewpoints.

As indicated in Table I below, which gives their composition in % of the fatty acids and their 2-monounsaturated triglycerides in % of the triglycerides, these fats contain more linoleic and oleic acid and, correlatively, more monosaturates-diunsaturates than cocoa butter. The fractionation described hereinafter reduces the content of these triglycerides in the concrete fraction ($C_1$), bringing its physico-chemical properties into line with those of cocoa butter and making it compatible with cocoa butter. The fraction (1) may therefore be used as an ingredient of a cocoa butter substitute in chocolate.

TABLE I

|  | Mango | Sal | Mowrah | Kokum |
|---|---|---|---|---|
| Palmitic acid | 8–9 | 6–7 | 16–24 | 2–3 |
| Stearic acid | 40–42 | 42–44 | 20–25 | 52–58 |
| Oleic acid | 40–42 | 38–42 | 43–45 | 38–40 |
| Linoleic acid | 5–8 | 4–7 | 9–14 | 2–3 |
| 2-monounsaturates | 46–50 | 64–79 | 26–30 | 73–78 |

The fractionation cycle comprises the following steps:

(1a) The refined fat is heated to convert it entirely into liquid form, i.e. to a temperature of from 60° to 80° C., depending on the fat used, for example to around 60° C. for sal butter and to around 70° C. for mango butter.

(1b) The liquid fat is cooled to a temperature 5° to 10° C. above its solidification temperature, i.e. generally to 30°–45° C.

(1c) The cooled liquid fat is seeded with stabilized $\beta$ crystals to direct crystallization towards the formation of a concrete fraction ($C_1$) of high melting point or stearin. The $\beta$ crystals consist essentially of saturated fatty acid triglycerides. They constitute the polymorphic form of those triglycerides which is stable and has a higher melting point or a higher melting range. The first seed crystals may be obtained by straightforward crystallization of the molten fat at 30°–35° C. and filtration.

Once production has started, $\beta$ crystals emanating from the stearin ($C_1$) obtained during the fractionation of a preceding batch may be used for seeding a batch. These $\beta$ crystals may emanate from cocoa butter or preferably from fractionated fat. Fractionation may have been carried out by the dry method or using a solvent, the solvent having been subsequently eliminated. Whatever their origin, the $\beta$ crystals will preferably have been stored for at least 4 weeks at 30°–35° C. The crystals are added in a quantity of from 0.05 to 0.2% by weight either as such or in the form of a 5–15% by weight suspension in the corresponding fluid fraction ($F_1$). The suspension is slowly stirred in order thoroughly to mix the crystals.

(1d) The suspension obtained in step (1c) is progressively cooled at a rate of 0.5° to 1.5° C./hour and preferably at a rate of 1° C./hour to facilitate the formation of coarse crystals down to the fractionation temperature which is preferably in the range from 20° to 35° C. Alternatively, the suspension may be left standing for 8 to 15 hours at the seeding temperature and then cooled under the conditions described above. The suspension may also be cooled as described above and then left standing for 8 to 15 hours at the fractionation temperature. The same operation may be carried out at an intermediate temperature by interrupting cooling.

Crystallization is carried out either in tanks or on trays.

(1e) Fractionation is carried out by means of a hydraulic press, for example a frame press. To this end, the suspension obtained in step (1d), which has assumed a paste-like consistency due to the crystal aggregates, is transferred to cloths or "press bags" which are arranged in stacks, each bag being separated from the adjacent bags by metal plates provided with drainage grooves. Alternatively, it is possible to use a semicontinuous automatic press of the type used for separating cocoa butter from the nibs, suitably modified for example, by replacing the metal filters by cloths having a mesh width of at most 2 microns.

In this step, the pressure should be applied in stages and should reach a level of at least 20 kg/cm$^2$ to obtain as complete as possible an expulsion of the fluid fraction. Preferably, the pressure is increased in stages of around 6–7 kg/cm$^2$, the pressure applied being maintained for at least 5 minutes, to at least 30 kg/cm$^2$, for example to 45 kg/cm$^2$, the maximum pressure being maintained for 1–2.5 hours. The operation lasts at most 1.5 to 3 hours.

Depending on the composition of the fat used, the concrete fraction ($C_1$) obtained represents from 10 to 90% by weight of the starting fat and its iodine value is in the range from 18 to 50. The iodine value depends upon the degree of unsaturation of the fatty acids contained in the triglycerides and is the number of grams of iodine fixed by 100 g of fat. In the present case, it indicates the degree of separation of the concrete fraction from the fluid fraction. The fluid fraction ($F_1$) or olein has an iodine value of from 45 to 70.

The fluid fraction ($F_1$) may be used in foods either as such or after slight hydrogenation, for example as table oil.

SCHEME 2

This embodiment comprises two successive fractionation cycles and is particularly suited to palm oil which has a comparatively higher content of triunsaturated triglycerides having a high melting range. Table II below gives its composition in % of the fatty acids and also the number of 2-monounsaturated and trisaturated triglycerides in % of the triglycerides.

TABLE II

| Palmitic acid | 41–49 |
| Stearic acid | 4–6 |
| Oleic acid | 27–53 |
| Linoleic acid | 5–10 |
| 2-monounsaturates | 40–45 |
| Trisaturates | 6–9 |

In this case, the fractionation of step 1e) of the first cycle (according to scheme 1) makes it possible to separate a concrete fraction ($C_1$) having an iodine value of 18–24 in a yield of 10 to 12% by weight. This fraction ($C_1$) has a melting range of 45°–55° C. It may be used for hardening shortenings or margarines or may even form part of cosmetic or pharmaceutical products.

The fluid fraction ($F_1$) undergoes a second fractionation cycle under the following conditions:

(2a) The fluid fraction ($F_1$) having an iodine value of greater than 55 and preferably from 56 to 56.5 represents from 90 to 93% by weight of the starting fat. The starting fat is heated to a temperature of from 40° to 60° C. and preferably to a temperature of approximately 45° C. to convert it completely into liquid form.

(2b) The liquid obtained in step (2a) is cooled to a temperature around 30° C. which is 3°–5° C. above the solidification temperature of the fraction ($F_1$).

(2c) The cooled liquid is seeded with stabilized $\beta'$ crystals to direct crystallization towards the formation of a desired intermediate concrete fraction ($C_2$). The $\beta'$ crystals consist essentially of 2-monounsaturated triglycerides which may be obtained by the crystallization of a fraction ($F_1$) heated to approximately 45° C. and cooled to a temperature of 20°–30° C., followed by filtration. Once production has started, $\beta'$ crystals emanating from a fraction ($C_2$) of a preceding batch will preferably be used for seeding a batch. Preferably, these crystals will have been stabilized by storage for at least 4 weeks at 20°–30° C. They are added as such in a quantity of from 0.05 to 0.2% by weight or in the form of a 5–15% by weight suspension in the corresponding fluid fraction ($F_2$) with slow stirring.

(2d) The suspension obtained in step 2c) is cooled at a rate of 0.05°–1.5° C./hour and preferably at a rate of 1° C./hour to 15°–20° C., preferably after it has been left standing for 8 to 15 h at the seeding temperature.

The suspension is then left standing for 72–120 hours at 15°–20° C. and preferably at 15°–18° C.

(2e) The suspension is fractionated as indicated above in reference to scheme 1 under the following particular conditions: the pressure is increased in stages of 6–7 kg/cm$^2$, the pressure applied in each stage being maintained for at least 5 minutes and preferably for 10 to 15 minutes. The maximum pressure is at least 30 kg/cm$^2$ and preferably 45 kg/cm$^2$ and is maintained for at least 1 h and preferably for around 2 h.

In the present case, it is important to ensure that the temperature does not exceed 18° C., particularly at the beginning of fractionation. This is because excessive heating during pressing could result in partial melting of the crystals which would in turn result in a reduction in yield and would promote the subsequent appearance of undesirable crystal forms.

The foregoing procedure gives a concrete fraction ($C_2$) having physico-chemical characteristics very similar to those of cocoa butter in a global yield of around 30% by weight, based on the fat used, and a fluid fraction ($F_2$) having an iodine value of 65–68.

In one preferred embodiment, it is possible to improve the global yield of concrete fraction ($C_2$) to 33% by leaving the fluid fraction ($F_2$) to crystallize for 2 to 3 days at approximately 15° C. and recovering a concrete fraction ($C_3$) by pressing under the conditions applied to the fraction ($F_2$); the fraction ($C_3$) may be added to the following batch ($F_1$) in step 2e).

The concrete fraction ($C_2$) melts at body temperature and, accordingly, has many uses in confectionery and biscuit manufacture as a substitute for cocoa butter, in cosmetics, for example as a cream, lotion or lipstick base, and in the pharmaceutical field as a medicament support, for example as a suppository. In chocolate manufacture, it may be used on its own or in combination with a vegetable tallow in a fat composition intended as a substitute for cocoa butter. In a fat composition such as this, the vegetable tallow will preferably be in the form of one or more concrete fraction(s) ($C_1$), for example sal butter or mango butter. The concrete fraction(s) ($C_1$) will advantageously represent from 10 to 60%, for example 50%, by weight of the composition.

The fluid fraction ($F_2$) may be used as table oil, more particularly as frying oil.

The invention is illustrated by the following Examples in which the percentages are percentages by weight. In the Examples, I.V. is the iodine value as determined by titration with sodium thiosulfate of the iodine released by the addition of potassium iodide to a solution containing the fat and iodine chloride (reagent) by comparison with a reference solution of the reagent without the fat (Method 2.205, I.U.P.A.C. "Standard Methods for the Analysis of Oils, Fats and Derivatives", Pergamon Press, 6th Edition, 1979).

In the following Comparison Example, an iodine value balance was made. This operation comprises comparing the I.V. of the starting fat with the weighted sum of the I.V.'s of the concrete fraction (C) and the fluid fraction (F) obtained:

I.V.=I.V$_C$.×C+I.V$_F$.×F, C and F being, respectively, the percentages of concrete fraction and fluid fraction obtained by fractionation.

The suitability of a concrete fraction ($C_1$) or ($C_2$) to be mixed with cocoa butter is verified by studying its behavior on cooling, giving its solidification point, under clearly defined conditions (Shukoff's method, reference temperature 0° C., I.U.P.A.C., Method 2.132), by determining its melting curve, giving the solid fat index (S.F.I.) or the percentage of solid fat present in the partially melted fat at a given temperature, by pulsed NMR (nuclear magnetic resonance of the proton) (I.U.P.A.C., 1st Supplement, 1982, Method 2.323) or by dilatometry (I.U.P.A.C., 6th Edition, 1979, Method 2.141), by its use in chocolates in conjunction with cocoa butter either on its own or in admixture with another concrete fraction.

The following Comparison Example shows the yields and I.V.'s obtained for the fraction ($C_2$) of palm oil in accordance with the present invention (A) by comparison with the fractionation of palm oil with hexane (B) and acetone (C), respectively, under the following conditions:

(B) The fluid fraction ($F_1$) emanating from fractionation in accordance with scheme 2 above is heated to 45° C. and dissolved in hexane in a ratio by weight of hexane to olein of 3:1, after which the solution is cooled to −10° C. and left to crystallize for 24 h at −10° C., the suspension is stirred for 5 minutes at 3-4 r.p.m. 4 h before the separation of the crystals and the crystals are filtered using a frame filter. The crystals are collected and melted and the solvent evaporated.

(C) The procedure is as in (B) except that a ratio by weight of acetone to fluid fraction ($F_1$) of 6:1 is used and the suspension is crystallized for 24 h at 5° C.

Where solvents are used, as in (B) and (C) above, separation of the crystals may be carried out in any apparatus suitable for liquid/solid separation without the application of pressure, for example in a filter or a centrifugal separator.

EXAMPLE 1

Preparation of palm olein ($F_1$)

100 kg of palm oil freed from mucilages and neutralized (containing at most 0.1% of free fatty acids), I.V. 53, are heated to 60° C. and then cooled to 45° C.

The oil is seeded at 45° C. with 100 g (0.1%) of $\beta$ crystals of concrete palm fraction (stearin) prepared as described hereinafter. After it has been transferred to a tank, the suspension is progressively cooled to 30° C. in 12 h. The suspension of the crystals formed is filtered in a frame press. The pressure cycle used is 2 h at 30° C., the maximum pressure of 30 kg/cm² being reached in 35 mins. at intervals of 7 mins. 90 kg of clear fluid fraction (olein $F_1$) having an I.V. of 56-56.5 and 10 kg of a concrete fraction (stearin $C_1$) having an I.V. of 22-24, representing 10% of the oil used, are collected. The iodine value of the stearin ($C_1$) depends upon the separation efficiency: thus, a low iodine value is indicative of a high separation yield. A precise iodine value for the olein ($F_1$) is merely indicative of orientation of the crystallization process without detriment to the yield.

Preparation of the concrete fraction ($C_2$)

90 kg of the preceding fraction ($F_1$) are heated to 45° C. and seeded with 90 g (0.1%) of stabilized $\beta'$ crystals (fraction $C_2$) prepared as described above. After the crystals have been mixed with the liquid, the suspension is cooled for 10 h to 26°-27° C. It is then transferred in batches of 25 kg onto trays at that temperature, cooled to 18° C. in 8 h and left to crystallize for 4 days at 18° C., care being taken to ensure that the temperature of the trays stays between 17° and 19° C.

The suspension is then transferred to press bags which are stacked in a hydraulic press and collectively subjected to a pressure increasing progressively in stages of 6-7 kg/cm² every 15 minutes to 20 kg/cm², i.e. in 45 minutes, which corresponds to a reduction of the charge of around 30%. The duration of the increase in pressure naturally depends upon the type of press used and its geometry. The pressure is then increased in stages of 6-7 kg/cm² every 15 minutes to 45 kg/cm², i.e. in 1 h and pressing is continued at that pressure for 2 h. A concrete fraction ($C_2$), I.V. 36-38, yield 30%, and a fluid fraction ($F_2$) having an I.V. of 65-67 are obtained.

Preparation of $\beta$ and $\beta'$ crystals of palm stearin

The $\beta$ seed crystals are prepared by tempering the palm oil for 2 weeks at 30°-35° C. The crystals formed are separted by filtration and left standing for 2 weeks at 30°-35° C.

To prepare the $\beta'$ seed crystals, the fluid fraction ($F_1$) is tempered for 2 weeks at 20°-28° C. The crystals formed are separated by filtration and left standing for 2 weeks at 20°-28° C.

Once production has started, part of the stearin fractions ($C_1$) and ($C_2$), respectively, may be removed from the following batches and tempered as indicated above for at least 2 weeks in order to collect stabilized $\beta$ and $\beta'$ crystals, respectively, the crystals then being left standing for 2 weeks.

Comparison Example

A refined palm oil having an I.V. of 53 is fractionated
(A) by the method of Example 1,
(B) as previously described, the last step using hexane,
(C) as previously described, the last step using acetone,
(D) in accordance with Example 1 of German Patent Application No. 29 16 604.

The yields based on the fat used and the I.V's of the various fractions are shown in Table III below:

TABLE III

| | A | | B | | C | | D | |
|---|---|---|---|---|---|---|---|---|
| | I.V. | Yield % | I.V. | Yield % | I.V. | Yield % | I.V. | Yield % |
| Starting palm oil 1st pressing | 53 | | 53 | | 53 | | 53 | |

TABLE III-continued

| | A | | B | | C | | D | |
|---|---|---|---|---|---|---|---|---|
| | I.V. | Yield % | I.V. | Yield % | I.V. | Yield % | I.V. | Yield % |
| or filtration for D | | | | | | | | |
| Stearin (C$_1$) | 22–24 | 10 | 22–24 | 10 | 22–24 | 10 | 31[1] | 16.7 |
| Olein (F$_1$) | 56.5 | | 56.4 | | 56.5 | | 58[2] | |
| 2nd pressing or filtration for B, C & D | | | | | | | | |
| Stearin (C$_2$) | 36–38 | 33 | 38–40 | 35 | 36 | 40 | 33[3] | 52 |
| Olein (F$_2$) | 65–67 | | 68 | | 70 | | 60[3] | 48 |
| Global yield | | 30[4] | | 32 | | 36 | | 43 |

Legend:
[1] The I.V. of the stearin is too high and shows that a certain quantity of olein (F$_1$) is still present due to the poor separation
[2] On the basis of the yields indicated, evaluation of the I.V.'s gives an I.V. of 58 for the olein (F$_1$).
[3] On the basis of the I.V.'s indicated, the I.V. balance gives: 58 = 33 .C + 60 .F with C + F = 1, i.e. C = 0.07 In fact, only 7% of stearin (C$_2$) having an iodine value of 33 is obtained.
[4] The global yield may be increased to 33% if the olein (F$_2$) is left to crystallize for 2 to 3 days at 15° C. A concrete fraction (C$_3$) (I.V. 52–53, yield 15%) and a fluid fraction (F$_3$) (I.V. 67–68, yield 85%) are thus recovered by pressing under the conditions described in Example 1 in reference to the preparation of the concrete fraction (C$_2$). The concrete fraction (C$_3$) may be added to the following batch (F$_1$).

Table IV below shows the S.F.I. the Shukoff values of the concrete fractions (C$_2$) obtained by methods A, B and C compared with those obtained for cocoa butter.

TABLE IV

| | Concrete fraction (C$_2$) acc. to A | | Concrete fraction (C$_2$) acc. to B | | Concrete fraction (C$_2$) acc. to C | | Cocoa butter | |
|---|---|---|---|---|---|---|---|---|
| I.V. | 38 | | 38–40 | | 36 | | 36 | |
| S.F.I. (%) at temperature (°C.) | | | | | | | | |
| 25 | 54 | | 52 | | 62 | | 63 | |
| 30 | 32 | | 25 | | 35 | | 41 | |
| 35 | 5 | | 2 | | 5 | | 0 | |
| 40 | 0 | | 0 | | 0 | | | |
| Shukoff cooling curve (0° C.) | | | | | | | | |
| Minimum temperature (°C.) in time (mins) | 18.0 | 27 | 14.7 | 37 | 18.4 | 30 | 17.7 | 39 |
| Maximum temperature (°C.) in time (mins.) | 20.6 | 50 | 18.3 | 70 | 22.1 | 52 | 20.6 | 60 |
| Δ temperature (°C.) | 2.6 | | 3.6 | | 3.7 | | 2.9 | |
| Δ time (mins.) | | 23 | | 33 | | 22 | | 21 |
| Δ temperature/Δ time (°C./mins.) | 0.11 | | 0.11 | | 0.17 | | 0.14 | |

EXAMPLES 2–3

The analytical values for these Examples (S.F.I., yield, I.V., Shukoff cooling curve) are set out in Table V below.

2. 100 kg of refined sal butter are heated to 60° C. and, after cooling to 30° C., are seeded with 1 kg of a suspension containing 10% of β crystals of sal stearin in liquid sal olein, these crystals having been stabilized as indicated in Example 1. The suspension obtained is left standing for 12 h at 30° C. and cooled to 26° C. in 4 h. The suspension is fractionated in 2 h as described in Example 1 in reference to the preparation of the fraction (F$_1$), except that the operation takes place at 26° C. and the maximum pressure is 35 kg/cm². 80 kg of a concrete fraction (C$_1$) are obtained.

3. 1 kg of refined mango kernel butter is heated to 68° C., cooled to 30° C. and seeded with 1 g (0.1%) of β crystals of mango stearin stabilized as described in Example 1. The suspension is cooled for 5 h to 23° C. and then kept for 15 h at 23° C. The suspension is fractionated in 2 h as described in Example 1 in reference to the preparation of the fraction (F$_1$), except that the operation takes place at 23° C. and the maximum pressure is 36.5 kg/cm². 670 g of a concrete fraction (C$_1$) are obtained.

TABLE V

| Example | 2 | | 3 | |
|---|---|---|---|---|
| S.F.I. at | | | | |
| 25 (°C.) | 74 | | 45 | |
| 30 | 69 | | 37 | |
| 35 | 41 | | 9 | |
| 40 | 0 | | 0 | |
| Yield of stearin (%) | 78 | | 70 | |
| I.V. stearin | 33 | | 42 | |
| olein | 45 | | 61 | |
| Shukoff cooling curve (0° C.) | | | | |
| Minimum temperature (°C.) in time (mins.) | 18.8 | 43 | 18.0 | 32 |
| Maximum temperature (°C.) in time (mins.) | 25.1 | 51 | 26.4 | 44 |
| Δ temperature (°C.) | 6.3 | | 8.4 | |
| Δ time (mins.) | | 18 | | 12 |
| Δ temperature/Δ time (°C./mins.) | 0.35 | | 0.7 | |

EXAMPLE 4

4 chocolate masses are prepared from the following ingredients.

The foreign fat consists of: 100% of concrete fraction (C$_2$) of Example 1 (I); 10% of concrete fraction (C$_1$) of Example 2/90% of concrete fraction (C$_2$) of Example 1 (II) and 40% of concrete fraction (C$_1$) of Example 2/60% of concrete fraction (C$_2$) of Example 1 (III).

| Ingredient, % by weight | Milk chocolate | Plain chocolate |
|---|---|---|
| Sugar | 43.3 | 48.7 |
| Nibs (Ghana) | 12.0 | 45.2 |
| Milk powder (26% fat, based on dry matter) | 27.5 | — |

-continued

| Ingredient, % by weight | Milk chocolate | Plain chocolate |
| --- | --- | --- |
| Cocoa powder (12–14% cocoa butter, based on dry matter) | — | 0.7 |
| Deodorized cocoa butter | 11.8 | — |
| Foreign fat (corresponds to approx. 16–18% of the total fat) | 5.0 | 5.0 |
| Lecithin | 0.4 | 0.4 |
| Vanillin (traces) | — | — |

The various ingredients, except the lecithin, the vanillin and some of the fat, are mixed at 40° C. in such a way that the mixture contains from 27 to 29% by weight of fat, after which the mixture is finely ground in a roll mill. The ground mixture is then conched for 24 h at 55° C., the remainder of the fat being added in portions. The vanillin and then the lecithin are added just before the end of conching. After conching, the milk chocolate is cooled to 27° C. and the plain chocolate to 29° C., followed by tempering at 29° C. and at 30°–31° C., respectively.

The compatibility of the foreign fat with the cocoa butter is evaluated by the following tests:

Mould releasability

Metal moulds are filled with 100 g of the tempered chocolate and placed in a refrigerated chamber at 4° C. After about 5 mins, the moulds are inverted and vibrated and the time (mins.) which the chocolate takes to separate from the mould is recorded.

Fat bloom

Fat bloom is the appearance of a whitish layer of fat at the surface of the chocolate. This undesirable phenomenon occurs more readily the more the foreign fat interacts with the cocoa butter. It is thus a good indication of its compatibility. The chocolate is subjected to 30 tempering cycles comprising 12 h at 15° C., then 12 h at 28° C. and finally another 12 h at 15° C. and the results obtained are recorded on a scale of 1 to 5 as follows:

1 = no change (shiny appearance)
2 = slightly clouded
3 = clouded
4 = fat bloom
5 = considerable bloom The number of tempering cycles after which there is a change of 1 unit on the scale is also noted. 1/18, 2/6, 3/6 for example signifies that, after 18 cycles, the sample has a rating of 2, after 6 more cycles it moves onto 3 and remains at 3 after 30 cycles.

The results are shown in Table VI below:

TABLE VI

| | Milk chocolate | | Plain chocolate | |
| --- | --- | --- | --- | --- |
| Sample | Whitening | Mould separation time (mins.) | Whitening | Mould separation time (mins.) |
| I | 1/30 | 26.5 | 1/24;3/6 | 19.3 |
| II | 1/30 | 31.3 | 1/24;3/6 | 21.6 |
| III | 1/30 | 27.9 | 1/18;2/6;3/6 | 20.6 |
| Cocoa butter | 1/30 | 25 | 1/20;2/4;3/6 | 20 |

I claim:

1. A process for the dry fractionation of a pre-refined vegetable fat capable of crystallizing in several forms at temperatures between 20° and 35° C. comprising:
   (a) heating the pre-refined fat to convert it entirely into liquid form,
   (b) cooling the liquid of step (a) to a temperature 3° to 10° C. above its solidification temperature,
   (c) seeding the cooled liquid with storage-stabilized $\beta$ crystals obtained from said fat or from cocoa butter to obtain a suspension,
   (d) progressively cooling the suspension of step (c) at a rate of 0.5° to 1.5° C. per hour to a fractionation temperature in the range from 20° to 35° C., and then
   (e) filtering the suspension of step (d) under a pressure of at least 20 kg/cm$^2$ at the fractionation temperature and collecting a concrete fraction ($C_1$) having an iodine value of at most 50 and a fluid fraction ($F_1$) having a higher iodine value than the concrete fraction ($C_1$), the difference between the iodine value of the fraction ($C_1$) and that of the fraction ($F_1$) being at least 10.

2. A process as claimed in claim 1 wherein the fat used is selected from the group consisting of shea butter, mango kernel butter, sal butter, Borneo tallow, mowrah fat and kokum butter, and the cooled liquid is seeded with from 0.05 to 0.2% by weight of the stabilized $\beta$ crystals of said fat or of cocoa butter.

3. A process as claimed in claim 2 wherein the suspension of step (d) is left standing for 8 to 15 hours at the seeding temperature, at the fractionation temperature, or at an intermediate temperature.

4. A process as claimed in claim 2 wherein the suspension of step (d) is filtered by applying and increasing the pressure progressively in stages so that the pressure increases by approximately 6–7 kg/cm$^2$ in each stage, and maintaining the increased pressure of each stage for at least 5 minutes, the pressure increasing to a maximum pressure of at least 30 kg/cm$^2$ which is maintained for at least 1 hour, and collecting a concrete fraction ($C_1$) having an iodine value of from 33 to 42.

5. A process for fractionating palm oil comprising a first fractionation cycle according to the process as claimed in claim 1, further comprising subjecting the collected fluid fraction ($F_1$), having an iodine value of greater than 55, of the first fractionation cycle to a second fractionation cycle by:
   (2a) heating the collected fluid fraction ($F_1$) to convert it completely into liquid form,
   (2b) cooling the liquid of step 2a) to a temperature 3° to 5° C. above its solidification temperature,
   (2c) seeding the cooled liquid with storage-stabilized $\beta'$ crystals obtained from palm oil or from cocoa butter to obtain a suspension,
   (2d) progressively cooling the suspension of step (2c) at a rate of 0.5° to 1.5° C./hour to a temperature of 15° to 20° C. and allowing the suspension obtained to stand at that temperature for 72 to 120 hours, then
   (2e) filtering the suspension of step (2d) by applying and increasing pressure progressively in stages so that the pressure increases by approximately 6–7 kg/cm$^2$ in each stage, and maintaining the increased pressure for at least 5 minutes, the pressure increasing to a maximum pressure of at least 30 kg/cm$^2$ which is maintained for at least 1 hour, and collecting a concrete fraction ($C_2$) having an iodine value of 36–38 and a fluid fraction ($F_2$) having an iodine value of 65–68.

6. A process as claimed in claim 5 wherein the liquid of step (c) of the first fractionation cycle is seeded with from 0.05 to 0.2% by weight of storage-stabilized $\beta$ crystals and the liquid of step 2c) of the second fractionation cycle is seeded with from 0.05 to 0.2% by weight of storage-stabilized $\beta'$ crystals.

7. A process as claimed in claim 5 wherein the suspension of step (2d) of the second fractionation cycle is left standing for 8 to 15 hours at the seeding temperature before it is cooled.

8. A process as claimed in claim 5 further comprising allowing the fluid fraction ($F_2$) to stand and crystallize for 2 to 3 days at approximately 15° C. and then filtering the suspension obtained under the fractionation conditions of step 2e) of the second fractionation cycle and collecting a fluid fraction ($F_3$) and a concrete fraction ($C_3$) and adding the concrete fraction ($C_3$) to the suspension of step 2d) during a second fractionation cycle applied to a subsequent batch.

9. A process as claimed in claim 2 wherein the storage-stabilized $\beta$ crystals are stabilized by storage for at least four weeks at 30°-35° C.

10. A process as claimed in claim 5 wherein the storage-stabilized $\beta$ crystals are stabilized by storing them for at least four weeks at 30°-35° C. and the storage-stabilized $\beta'$ crystals are stabilized by storing them for at least four weeks at 20°-30° C.

11. A process as claimed in claim 5 or 6 further comprising preparing the storage-stabilized $\beta$ crystals from palm oil by tempering and crystallizing palm oil for two weeks at 30°-35° C., separating the crystals by filtration and allowing them to stand for 2 weeks at 30°-35° C.

12. A process as claimed in claim 5 or 6 further comprising preparing the storage-stabilized $\beta'$ crystals from palm oil by tempering and crystallizing fluid fraction ($F_1$) for 2 weeks at 20°-28° C., separating the crystals by filtration and allowing them to stand for two weeks at 20°-28° C.

13. A process as claimed in claim 5 or 6 wherein the $\beta'$ crystals are obtained from a fraction ($C_2$) of a previous batch.

14. A process as claimed in claim 5 wherein the temperature of the suspension intially does not exceed 18° C. in step (2d).

* * * * *

UNITED STATES PATENT AND TRADEMARK OFFICE
CERTIFICATE OF CORRECTION

PATENT NO. : 4,594,194
DATED : June 10, 1986
INVENTOR(S) : Albrecht Dieffenbacher It is certified that error appears in the above—identified patent and that said Letters Patent is hereby corrected as shown below:

Column 1, line 21, "is" should read -- in --.

Column 1, line 51, the second occurence of "B" should read -- B' --.

Column 3, line 27, "in vacuo" should read -- $\underline{in}$ $\underline{vacuo}$ --.

Column 6, line 10, "0.05" should read -- 0.5 --.

Signed and Sealed this

Twenty-sixth Day of August 1986

[SEAL]

Attest:

DONALD J. QUIGG

Attesting Officer     Commissioner of Patents and Trademarks